United States Patent
Seok et al.

(10) Patent No.: US 10,075,635 B2
(45) Date of Patent: Sep. 11, 2018

(54) APPARATUS AND METHOD FOR GENERATING PANORAMIC IMAGE BASED ON IMAGE QUALITY

(71) Applicant: ELECTRONICS AND TELECOMMUNICATIONS RESEARCH INSTITUTE, Daejeon (KR)

(72) Inventors: Joo Myoung Seok, Daejeon (KR); Sang Woo Ahn, Daejeon (KR); Yong Ju Cho, Daejeon (KR); Ji Hun Cha, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 212 days.

(21) Appl. No.: 14/994,430

(22) Filed: Jan. 13, 2016

(65) Prior Publication Data

US 2016/0212338 A1    Jul. 21, 2016

(30) Foreign Application Priority Data

Jan. 15, 2015    (KR) .................. 10-2015-0007341

(51) Int. Cl.
  *H04N 5/00*    (2011.01)
  *G06T 3/40*    (2006.01)
  *H04N 5/232*    (2006.01)

(52) U.S. Cl.
  CPC ....... *H04N 5/23238* (2013.01); *G06T 3/4038* (2013.01)

(58) Field of Classification Search
  None
  See application file for complete search history.

(56) References Cited

U.S. PATENT DOCUMENTS

| 7,126,630 B1* | 10/2006 | Lee ................ H04N 5/225 348/218.1 |
| 8,724,007 B2* | 5/2014 | Chen ............ H04N 5/23238 348/345 |
| 8,842,190 B2* | 9/2014 | Chen ............... G06T 3/0062 348/222.1 |
| 9,185,288 B2* | 11/2015 | Ki ................ H04N 5/23238 |
| 9,584,723 B2* | 2/2017 | Ki ................ H04N 5/23238 |
| 2012/0056977 A1 | 3/2012 | Ohnishi |

(Continued)

FOREIGN PATENT DOCUMENTS

| KR | 10-2008-010742 A | 12/2008 |
| KR | 10-2014-0106927 A | 9/2014 |

*Primary Examiner* — Reza Aghevli
(74) *Attorney, Agent, or Firm* — NSIP Law

(57) ABSTRACT

Disclosed are a method and an apparatus for generating a panoramic image based on an image quality. The method of generating a panoramic image includes extracting a matching point to connect a base image captured by a first camera and a reference image captured by a second camera, geometrically transforming the reference image by determining a homography between the base image and the reference image, determining a change in image quality of the geometrically transformed reference image, and generating a panoramic image in which the geometrically transformed reference image is connected to the base image based on the determined change in image quality.

15 Claims, 9 Drawing Sheets

(56) References Cited

U.S. PATENT DOCUMENTS

| | | | |
|---|---|---|---|
| 2013/0076854 A1* | 3/2013 | Ihara | H04N 5/23238 348/36 |
| 2014/0071228 A1* | 3/2014 | Cho | H04N 5/23238 348/36 |
| 2014/0114534 A1* | 4/2014 | Zhang | B60R 1/00 701/42 |
| 2014/0240452 A1 | 8/2014 | Ki et al. | |
| 2014/0285634 A1* | 9/2014 | Rhoads | G06T 3/4038 348/47 |
| 2015/0170405 A1* | 6/2015 | Hu | H04N 5/76 345/427 |
| 2015/0324952 A1* | 11/2015 | Namboodiri | G06T 3/4038 345/428 |
| 2015/0326833 A1* | 11/2015 | Li | H04N 21/21805 348/36 |

* cited by examiner

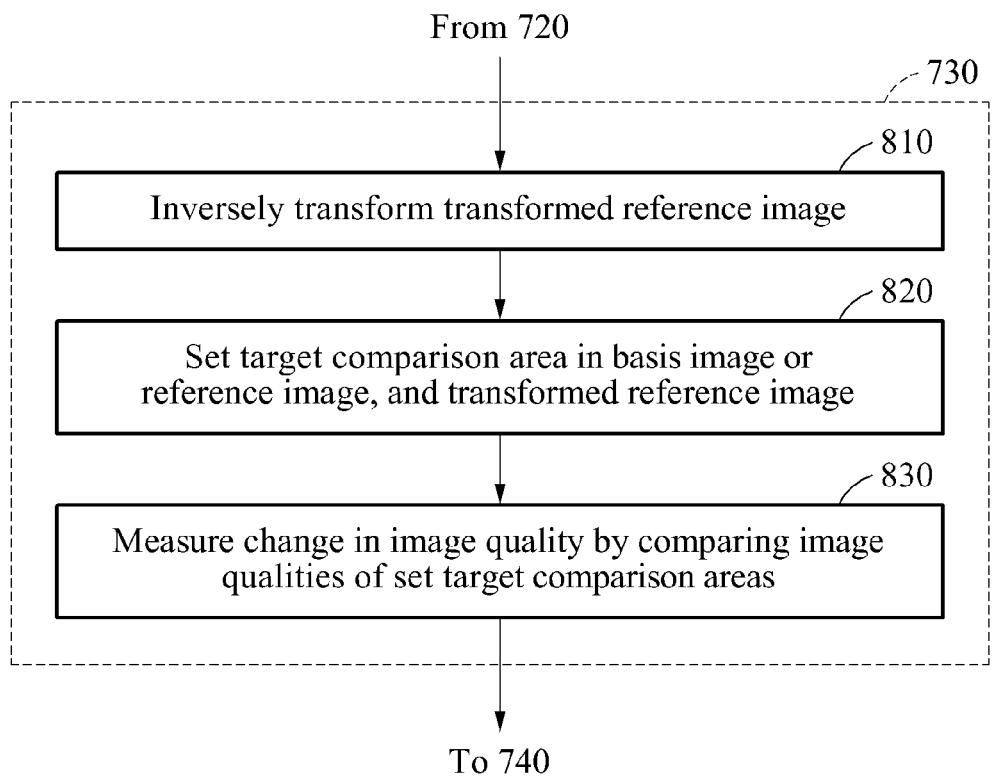

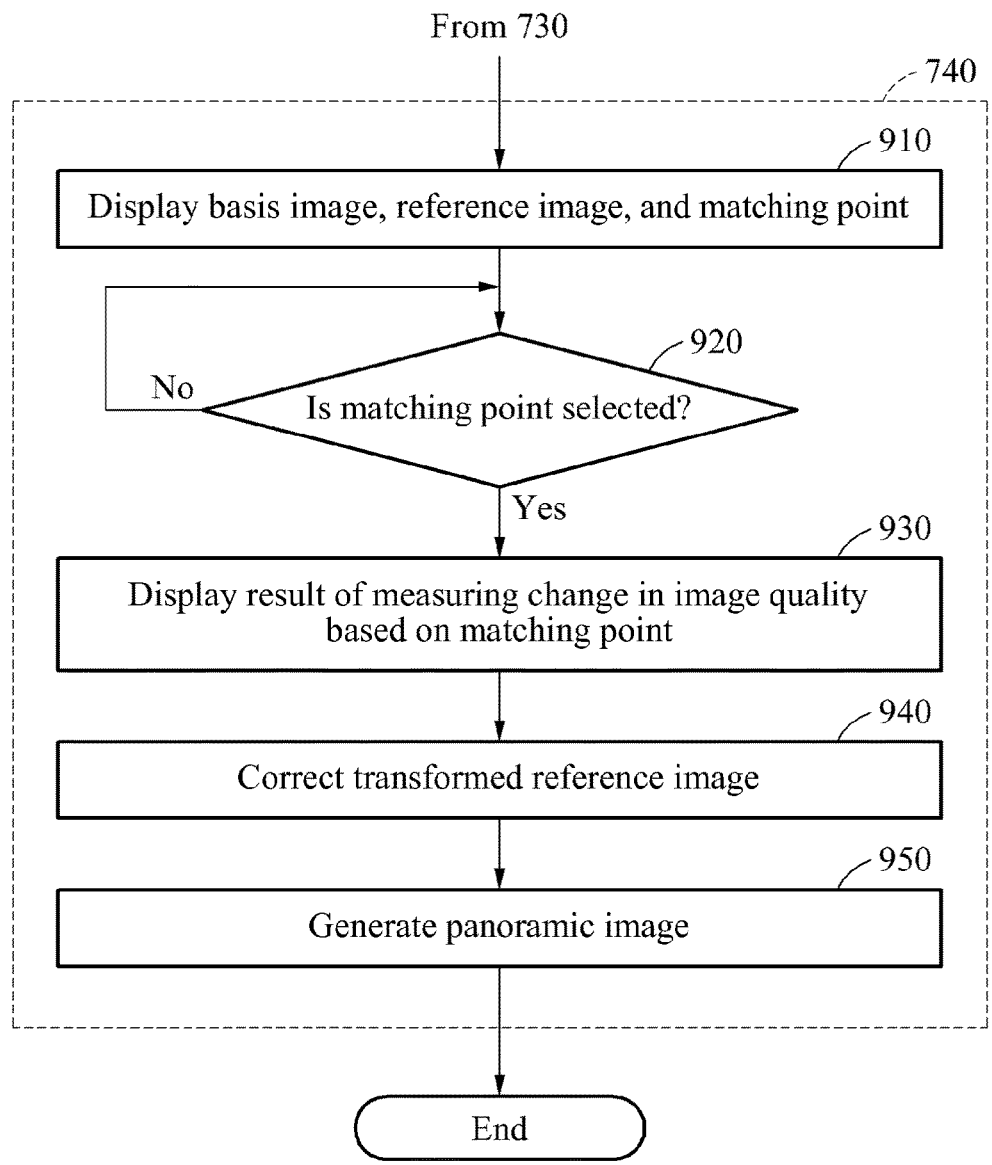

APPARATUS AND METHOD FOR GENERATING PANORAMIC IMAGE BASED ON IMAGE QUALITY

CROSS-REFERENCE TO RELATED APPLICATION

This application claims the priority benefit of Korean Patent Application No. 10-2015-0007341, filed on Jan. 15, 2015, in the Korean Intellectual Property Office, the disclosure of which is incorporated herein by reference.

BACKGROUND

1. Field of the Invention

Embodiments relate to an apparatus and a method for measuring a change in image quality occurring due to generation of a panoramic image and generating a panoramic image based on a result of the measuring.

2. Description of the Related Art

A method of generating a panoramic image may spatially stitch images obtained by capturing a target space which is divided into areas using a plurality of cameras and may thus provide a wide angle of view greater than an angle of human view.

A stitching method, which is an existing method of generating a panoramic image, may stitch neighboring images among a plurality of images captured by a plurality of cameras to generate a panoramic image.

An existing method of generating a panoramic image may generate neighboring images by capturing an object overlapping in a certain range using cameras. The method may then match feature points included in overlapping captured areas, extract matching points, and determine a homography which is a geometrical relationship between the neighboring images based on the matching points. The method may then geometrically transform a reference image to be stitched to a base image using the determined homography to generate a panoramic image.

Here, a degree of an image quality degradation of the geometrically transformed reference image may be determined based on an accuracy of the homography. The accuracy of the homography may vary depending on an image capturing method, a camera pose, a degree of overlap, a distance at which an object is captured, and the like. For example, when an object is present each in a short distance and a long distance within an overlapping area, a homography may be inclined to one object based on a location of a matching point and thus, an image quality may be significantly degraded.

Thus, in generating a panoramic image using a matching point, there is a desire for a method of predicting a change in image quality and selecting a matching point to minimize an image quality degradation.

SUMMARY

An aspect provides an apparatus and a method for readily estimating a change in image quality that may occur in a process of connecting a base image and a reference image to generate a panoramic image.

Another aspect also provides an apparatus and a method that enable a user to predict an image quality of a panoramic image generated using a corresponding matching point.

Still another aspect also provides an apparatus and a method that enable a capturer to readily verify a camera pose issue by predicting an image quality of a panoramic image using a captured image.

According to an aspect, there is provided a method of generating a panoramic image, the method including extracting a matching point to connect a base image captured by a first camera and a reference image captured by a second camera, geometrically transforming the reference image by determining a homography between the base image and the reference image based on the matching point, determining a change in image quality of the geometrically transformed reference image, and generating a panoramic image in which the geometrically transformed reference image is connected to the base image based on the determined change in image quality.

The determining of the change in image quality may include inversely transforming the geometrically transformed reference image, setting a target comparison area for comparison in the base image and the reference image based on the matching point, comparing an image quality of the set target comparison area in the base image or the reference image to an image quality of a target comparison area in the inversely transformed reference image, and estimating an image quality degradation occurring due to the geometrical transforming of the reference image based on a result of the comparing.

The setting of the target comparison area may include determining a first horizontal distance based on a direction in which the matching point is located from a center of the base image, determining a second horizontal distance based on a direction in which the matching point is located from a center of the reference image, determining a vertical distance based on a distance between the matching point and an upper end or a lower end of the base image, and setting the target comparison area by applying the first horizontal distance, the second horizontal distance, and the vertical distance based on the matching point.

The generating of the panoramic image may include displaying a plurality of matching points in response to the extracting of the matching points from the base image and the reference image, displaying a change in image quality of the reference image geometrically transformed based on a matching point selected from the matching points by a user, and generating a panoramic image in which the reference image geometrically transformed based on the matching point selected by the user is connected to the base image in response to the selecting of the matching point displaying the change in image quality.

According to another aspect, there is provided a method of measuring a change in image quality, the method including inversely transforming a geometrically transformed reference image based on a homography between a base image captured by a first camera and a reference image captured by a second camera, setting a target comparison area for comparison in the inversely transformed reference image, and the base image or the reference image based on a matching point to connect the base image and the reference image, comparing an image quality of the set target comparison area in the base image or the reference image to an image quality of the set target comparison area in the inversely transformed reference image, and estimating an image quality degradation occurring due to the geometrical transforming of the reference image based on a result of the comparing.

The setting of the target comparison area may include determining a first horizontal distance based on a direction in which the matching point is located in the base image, determining a second horizontal distance based on a direction in which the matching point is located in the reference image, determining a vertical distance based on a distance between the matching point and an upper end or a lower end of the base image, and setting the target comparison area by applying the first horizontal distance, the second horizontal distance, and the vertical distance based on the matching point.

When a right area of the base image is connected to a left area of the reference image, the determining of the first horizontal distance may include measuring a distance from the matching point to a rightmost end of the base image and determining the measured distance to be the first horizontal distance.

When the right area of the base image is connected to the left area of the reference image, the determining of the second horizontal distance may include measuring a distance from the matching point to a leftmost end of the reference image and determining the measured distance to be the second horizontal distance.

The determining of the vertical distance may include setting, to be a first vertical distance, a shorter distance of a distance from the matching point to an upper end of the base image and a distance from the matching point to a lower end of the base image, setting, to be a second vertical distance, a distance having a direction different from a direction of the first vertical distance of a distance from the matching point to an upper end of the reference image and a distance from the matching point to a lower end of the reference image, and setting the first vertical distance and the second vertical distance to be the vertical distance.

The inversely transformed reference image may be an image resulting from the inverse transforming of the homography between the base image and the reference image.

According to still another aspect, there is provided an apparatus for generating a panoramic image, the apparatus including a matching point extractor configured to extract a matching point to connect a base image captured by a first camera and a reference image captured by a second camera, a reference image transformer configured to geometrically transform the reference image by determining a homography between the base image and the reference image based on the matching point, an image quality change determiner configured to determine a change in image quality of the geometrically transformed reference image, and a panoramic image generator configured to generate a panoramic image in which the geometrically transformed reference image is connected to the base image based on the determined change in image quality.

The image quality change determiner may include an inverse transformer configured to inversely transform the geometrically transformed reference image, a target comparison area setter configured to set a target comparison area for comparison in the base image and the reference image based on the matching point, and an image quality change measurer configured to compare an image quality of the set target comparison area in the base image or the reference image to an image quality of a target comparison area in the inversely transformed reference image, and estimate an image quality degradation occurring due to the geometrical transforming of the reference image based on a result of the comparing.

The target comparison area setter may determine a first horizontal distance based on a direction in which the matching point is located from a center of the base image, determine a second horizontal distance based on a direction in which the matching point is located from a center of the reference image, determine a vertical distance based on a distance between the matching point and an upper end or a lower end of the base image, and set the target comparison area by applying the first horizontal distance, the second horizontal distance, and the vertical distance based on the matching point.

The panoramic image generator may include an image display configured to display a plurality of matching points in response to the extracting of the matching points from the base image and the reference image, a measurement result display configured to display a change in image quality of the reference image geometrically transformed based on a matching point selected from the matching points by a user, and an image generator configured to generate a panoramic image in which the reference image geometrically transformed based on the matching point selected by the user is connected to the base image in response to the selecting of the matching point displaying the change in image quality.

According to yet another aspect, there is provided an apparatus for measuring a change in image quality, the apparatus including an inverse transformer configured to inversely transform a geometrically transformed reference image based on a homography between a base image captured by a first camera and a reference image captured by a second camera, a target comparison area setter configured to set a target comparison area for comparison in the inversely transformed reference image, and the base image or the reference image based on a matching point to connect the base image and the reference image, and an image quality change measurer configured to compare an image quality of the set target comparison area in the base image or the reference image to an image quality of the set target comparison area in the inversely transformed reference image, and estimate an image quality degradation occurring due to the geometrical transforming of the reference image based on a result of the comparing.

The target comparison area setter may determine a first horizontal distance based on a direction in which the matching point is located in the base image, determine a second horizontal distance based on a direction in which the matching point is located in the reference image, determine a vertical distance based on a distance between the matching point and an upper end or a lower end of the base image, and set the target comparison area by applying the first horizontal distance, the second horizontal distance, and the vertical distance based on the matching point.

When a right area of the base image is connected to a left area of the reference image, the target comparison area setter may measure a distance from the matching point to a rightmost end of the base image and determine the measured distance to be the first horizontal distance.

When the right area of the base image is connected to the left area of the reference image, the target comparison area setter may measure a distance from the matching point to a leftmost end of the reference image and determine the measured distance to be the second horizontal distance.

The target comparison area setter may set, to be a first vertical distance, a shorter distance of a distance from the matching point to an upper end of the base image and a distance from the matching point to a lower end of the base image, set, to be a second vertical distance, a distance having a direction different from a direction of the first vertical distance of a distance from the matching point to an upper end of the reference image and a distance from the matching point to a lower end of the reference image, and set the first vertical distance and the second vertical distance to be the vertical distance.

The inversely transformed reference image may be an image resulting from the inverse transforming of the homography between the base image and the reference image.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 8 is a flowchart illustrating a process of determining a change in image quality in a method of generating a panoramic image according to an embodiment; and FIG. 9 is a flowchart illustrating a process of generating a panoramic image in a method of generating a panoramic image according to an embodiment.

DETAILED DESCRIPTION

Figure 1:
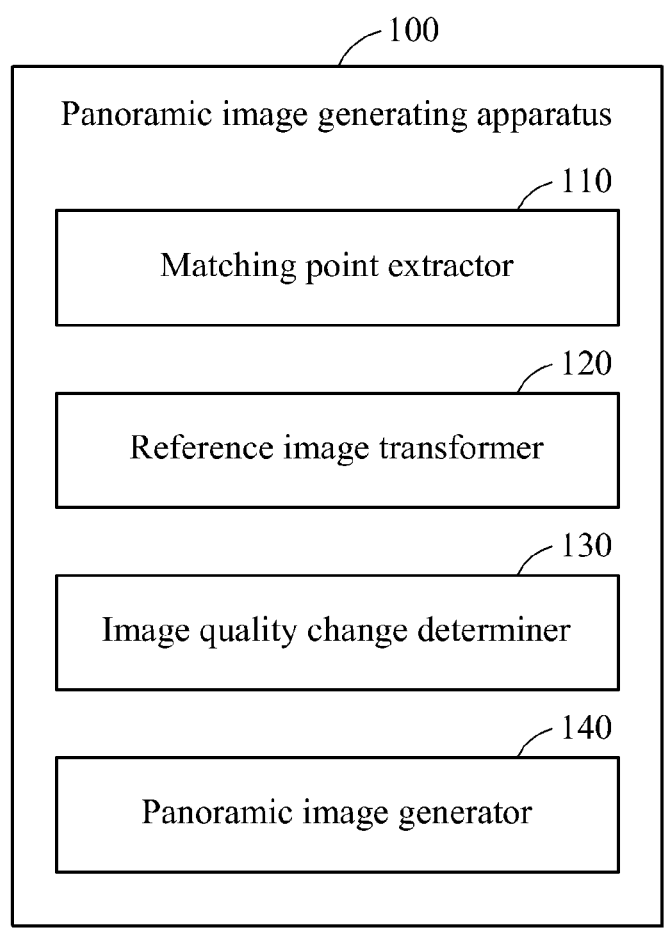
FIG. 1 is a diagram illustrating an apparatus for generating a panoramic image according to an embodiment.

Reference will now be made in detail to embodiments of the present invention, examples of which are illustrated in the accompanying drawings, wherein like reference numerals refer to the like elements throughout. Embodiments are described below to explain the present invention by referring to the figures. According to example embodiments described herein, a method of generating a panoramic image (hereinafter simply referred to as a panoramic image generating method) may be performed by an apparatus for generating a panoramic image (hereinafter simply referred to as a panoramic image generating apparatus).

FIG. 1 is a diagram illustrating a panoramic image generating apparatus 100 according to an embodiment.

The panoramic image generating apparatus 100 may generate a panoramic image by connecting a base image and a reference image through stitching. The base image and the reference image may be captured by different cameras. For example, the reference image captured by a second camera may be a neighboring image of the base image captured by a first camera. Thus, the reference image may include an area overlapping a left side or a right side of the base image.

Referring to FIG. 1, the panoramic image generating apparatus 100 includes a matching point extractor 110, a reference image transformer 120, an image quality change determiner 130, and a panoramic image generator 140.

The matching point extractor 110 extracts, from the base image and the reference image, a matching point to connect the base image and the reference image. Here, an object may be at least one of an object and a background included in the base image and the reference image.

In detail, the matching point extractor 110 selects at least one feature point from feature points of the object included in an overlapping area of the base image and the reference image. The object included in the overlapping area refers to an object included in both the base image and the reference image and thus, the feature point selected by the matching point extractor 110 is located in each of the base image and the reference image. The matching point extractor 110 matches the feature point in the base image and the reference image to extract the matching point.

The reference image transformer 120 determines a homography between the base image and the reference image based on the matching point extracted by the matching point extractor 110. The reference image transformer 120 geometrically transforms the reference image based on the determined homography between the base image and the reference image.

The image quality change determiner 130 determines a change in image quality of the geometrically transformed reference image that may occur due to the geometrical transforming of the reference image. The image quality change determiner 130 sets a target comparison area for comparison in the base image and the reference image based on the matching point, compares an image quality of the target comparison area in the base image or the reference image to an image quality of a target comparison area in the geometrically transformed reference image, and estimates an image quality degradation occurring due to the geometrical transforming of the reference image.

A configuration and process of determining the change in image quality by the image quality change determiner 130 will be described in detail with reference to FIG. 2.

The panoramic image generator 140 generates, based on the change in image quality determined by the image quality change determiner 130, a panoramic image in which the reference image geometrically transformed by the reference image transformer 120 is connected to the base image.

The panoramic image generator 140 provides a user with a result of measuring the change in image quality determined by the image quality change determiner 130 based on each matching point. Here, the panoramic image generator 140 receives, as an input, a matching point selected by the user. The panoramic image generator 140 generates a panoramic image of which an image quality is less degraded by connecting, to the base image, the reference image geometrically transformed based on the matching point received from the user.

Thus, the panoramic image generating apparatus 100 may readily estimate a change in image quality that may occur in a process of connecting a base image and a reference image to generate a panoramic image by setting target comparison areas for comparison in the base image, the reference image, and a geometrically transformed reference image, and comparing image qualities of the target comparison areas.

Further, the panoramic image generating apparatus 100 may provide a user with a result of measuring the change in image quality determined by the image quality change determiner 130 based on each matching point, and thus enable the user to predict an image quality of the generated panoramic image using a corresponding matching point.

Figure 2:
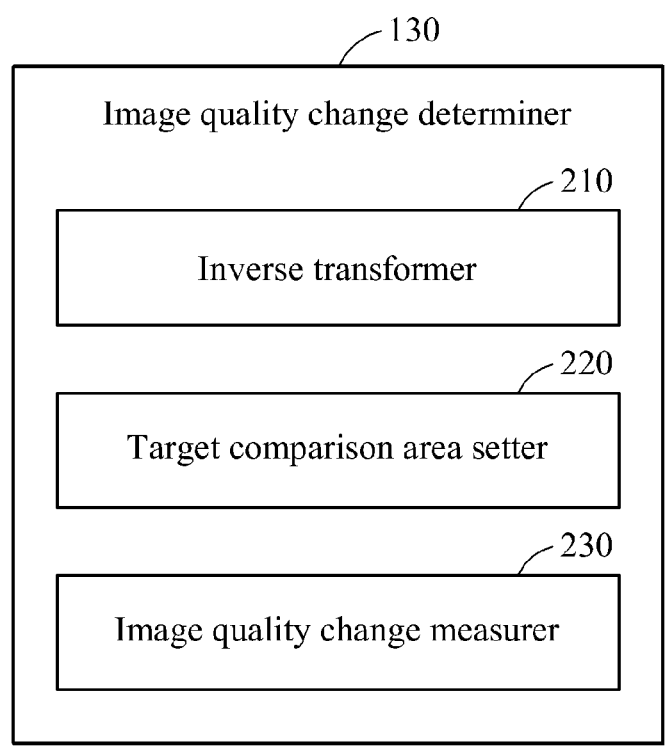
FIG. 2 is a diagram illustrating an image quality change determiner of an apparatus for generating a panoramic image according to an embodiment.

FIG. 2 is a diagram illustrating the image quality change determiner 130 of the panoramic image generating apparatus 100 of FIG. 1.

Referring to FIG. 2, the image quality change determiner 130 includes an inverse transformer 210, a target comparison area setter 220, and an image quality change measurer 230. The image quality change determiner 130 may be configured as a separate device from the panoramic image generating apparatus 100 and provide a result of measuring a change in image quality to the panoramic image generating apparatus 100.

The inverse transformer 210 inversely transforms a reference image geometrically transformed by the reference image transformer 120 of FIG. 1. The inversely transformed image is an image obtained by inversely transforming a homography between a base image and a reference image. That is, the image quality change determiner 130 may inversely transform the geometrically transformed reference image to transform the geometrically transformed reference image to a form similar to an original form of the reference image prior to the geometrical transforming, and compare an image quality of the inversely transformed reference image to an image quality of the base image and the reference image.

The target comparison area setter 220 sets a target comparison area for comparison in the base image and the reference image based on a matching point extracted by the matching point extractor 110 of FIG. 1.

The target comparison area setter 220 determines a first horizontal distance based on a direction in which the matching point is located from a center of the base image. For example, when a right area of the base image is connected to a left area of the reference image, the target comparison area setter 220 may measure a distance from the matching point to a rightmost end of the base image and determine the measured distance to be the first horizontal distance. Similarly, when a left area of the base image is connected to a right area of the reference image, the target comparison area setter 220 may measure a distance from the matching point to a leftmost end of the base image and determine the measured distance to be the first horizontal distance.

Also, the target comparison area setter 220 determines a second horizontal distance based on a direction in which the matching point is located from a center of the reference image. For example, when the right area of the base image is connected to the left area of the reference image, the target comparison area setter 220 may measure a distance from the matching point to a leftmost end in the reference image and determine the measured distance to be the second horizontal distance. Similarly, when the left area of the base image is connected to the right area of the reference image, the target comparison area setter 220 may measure a distance from the matching point to a rightmost end of the reference image and determine the measured distance to be the second horizontal distance.

In addition, the target comparison area setter 220 determines a vertical distance based on a distance from the matching point to an upper end or a lower end of the base image. Here, the target comparison area setter 220 sets, to be a first vertical distance, a shorter distance of a distance from the matching point to the upper end of the base image and a distance from the matching point to the lower end of the base image. The target comparison area setter 220 sets, to be a second vertical distance, a distance having a direction different from a direction of the first vertical distance of a distance from the matching point to an upper end of the reference image and a distance from the matching point to a lower end of the reference image. The target comparison area setter 220 sets the first vertical distance and the second vertical distance to be the vertical distance of the target comparison area.

The target comparison area setter 220 sets the target comparison area by applying the first horizontal distance, the second horizontal distance, and the vertical distance based on the matching point. For example, when the right area of the base image is connected to the left area of the reference image, the target comparison area setter 220 may set the target comparison area by applying the first horizontal distance rightwards from the matching point and the second horizontal distance leftwards from the matching point, and applying the vertical distance upwards and downwards from the matching point. When the left area of the base image is connected to the right area of the reference image, the target comparison area setter 220 may set the target comparison area by applying the first horizontal distance leftwards from the matching point and the second horizontal distance rightwards from the matching point, and applying the vertical distance upwards and downwards from the matching point.

The image quality change measurer 230 compares an image quality of the target comparison area in the base image or the reference image to an image quality of the target comparison area in the inversely transformed reference image. The image quality change measurer 230 estimates an image quality degradation that may occur due to the geometrical transforming of the reference image based on a result of the comparing.

For example, the image quality change measurer 230 may estimate the image quality degradation by calculating, as expressed in Equation 1, an error average based on a peak signal-to-noise ratio (PSNR) of the target comparison area in the inversely transformed reference image to the target comparison area in the base image or the reference image.

$$PSNR = 10 \cdot \log_{10}\left(\frac{MAX_I^2}{MSE}\right)$$
$$= 20 \cdot \log_{10}\left(\frac{MAX_I}{\sqrt{MSE}}\right)$$

[Equation 1]

A mean square error (MSE) in Equation 1 may be calculated as in Equation 2.

$$MSE = \sum_{i=0}^{m-1}\sum_{j=0}^{n-1}[I(i,j) - \mathbb{H}^{-1} \circ K(i,j)]^2$$

[Equation 2]

In Equation 2, "I(i,j)" denotes a feature point of a base image, and "K(i,j)" denotes a feature point of a reference image. That is, "$\mathbb{H}^{-1} \circ K(i,j)$" denotes a feature point of an inversely transformed reference image.

Here, the image quality change measurer 230 may compare the inversely transformed reference image to the original reference image that is not transformed, and determine an error against accuracy in a stitching process. The stitching process may include determining a homography or blending. In addition, the image quality change measurer 230 may compare the inversely transformed reference image to the base image. Thus, when a first camera and a second camera capture the base image and the reference image, respectively, an issue, for example, an error in camera poses and a discrepancy in camera properties, may be discovered.

Figure 3:
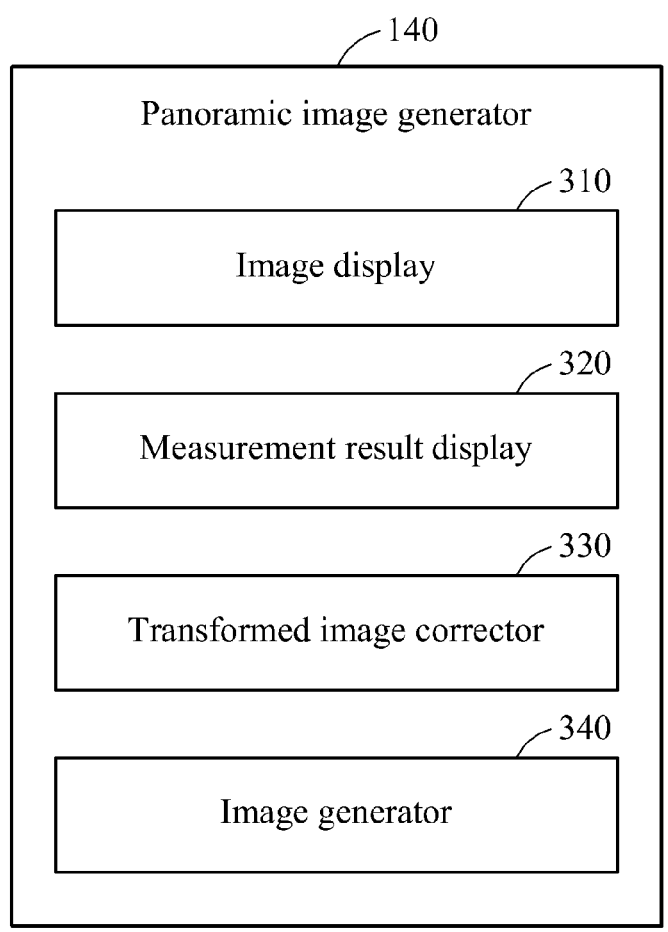
FIG. 3 is a diagram illustrating a panoramic image generator of an apparatus for generating a panoramic image according to an embodiment.

FIG. 3 is a diagram illustrating the panoramic image generator 140 of the panoramic image generating apparatus 100 of FIG. 1.

Referring to FIG. 3, the panoramic image generator 140 includes an image display 310, a measurement result display 320, a transformed image corrector 330, and an image generator 340.

The image display 310 displays a base image and a reference image on a screen to provide a user with the displayed base image and the reference image. The image display 310 displays a matching point extracted by the matching point extractor 110 of FIG. 1 in the base image and the reference image. When the matching point extractor 110 extracts a plurality of matching points, the image display 310 may display a list of the matching points on the screen.

The measurement result display 320 displays a result of measuring a change in image quality of the reference image geometrically transformed based on a matching point selected by the user from the matching points displayed by the image display 310. When the user selects at least one matching point from the list displayed by the image display 310, the measurement result display 320 may display a result of measuring a change in image quality of the reference image corresponding to the matching point selected by the user.

In an example embodiment of verifying and selecting a matching point directly by a user, the image display 310 and the measurement result display 320 may be included in the panoramic image generator 140.

In addition, the panoramic image generator 140 may generate a panoramic image based on the result of measuring the change in image quality of the geometrically transformed reference image without the selecting of the matching point by the user. In such a case, the panoramic image generator 140 may include the transformed image corrector 330 and the image generator 340.

The transformed image corrector 330 finely corrects the reference image geometrically transformed by the reference image transformer 120 of FIG. 1 based on the result of measuring the change in image quality of the geometrically transformed reference image. Also, when the user selects the matching point displaying the result of measuring the change in image quality by the measurement result display 320, the transformed image corrector 330 may finely correct, based on the result of measuring the change in image quality displayed by the measurement result display 320, the reference image geometrically transformed based on the matching point selected by the user.

The image generator 340 generates a panoramic image by connecting the reference image finely corrected by the transformed image corrector 330 to the base image. Here, a method of connecting the reference image to the base image performed by the image generator 340 may be stitching.

When the user selects the matching point that displays the result of measuring the change in image quality by the measurement result display 320, the image generator 340 may generate the panoramic image by connecting the reference image geometrically transformed based on the matching point selected by the user to the base image.

Figure 4:
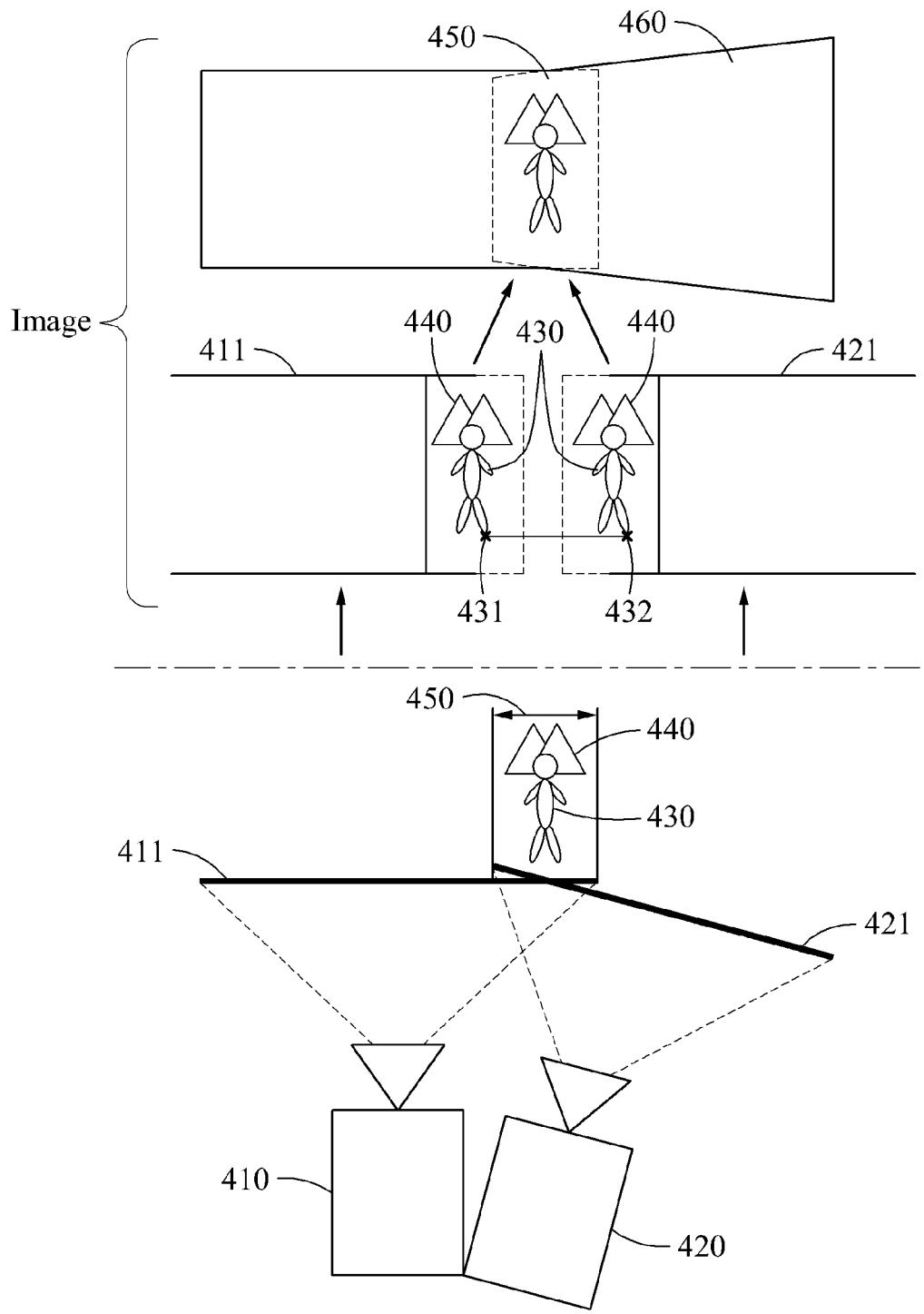
FIG. 4 illustrates a process of generating a panoramic image according to an embodiment.

FIG. 4 illustrates a process of generating a panoramic image according to an embodiment.

Referring to FIG. 4, a panoramic image generating system includes a plurality of cameras, for example, a first camera 410 and a second camera 420, and the panoramic image generating apparatus 100 of FIG. 1.

The panoramic image generating system disposes the first camera 410 and the second camera 420 in a radiation form as illustrated in FIG. 4 based on a central capturing point to capture a wide angle of view. Here, to stitch a base image 411 captured by the first camera 410 and a reference image 421 captured by the second camera 420, the panoramic image generating system captures the base image 411 and the reference image 421 to allow the base image 411 and the reference image 421 to include an overlapping area 450 in which an object 430 and a background 440 overlap in the base image 411 and the reference image 421.

The panoramic image generating apparatus 100 of the panoramic image generating system selects at least one feature point from feature points of the object 430 included in both the base image 411 and the reference image 421, and extracts a matching point by matching the selected feature point. The panoramic image generating apparatus 100 determines a homography, which is a geometrical relationship between the base image 411 and the reference image 421, based on the matching point.

Subsequently, the panoramic image generating apparatus 100 geometrically transforms the reference image 421 based on the determined homography. The panoramic image generating apparatus 100 stitches the base image 411 and the geometrically transformed reference image 421 to generate a panoramic image 460 in which the overlapping area 450 is processed.

Here, a change in image quality may occur in the process of geometrically transforming the reference image 421 based on the extracted matching point. Thus, the panoramic image generating apparatus 100 may verify an image quality of the geometrically transformed reference image 421 prior to the stitching of the geometrically transformed reference image 421 and the base image 411. The panoramic image generating apparatus 100 may change the matching point or finely correct the geometrically transformed reference image 421 based on a result of the verifying.

For example, the panoramic image generating apparatus 100 may extract a plurality of matching points and verify a change in image quality of the geometrically transformed reference image 421 based on each of the extracted matching points. The panoramic image generating apparatus 100 may select a reference image having a least change in image quality from reference images geometrically transformed for each matching point. The panoramic image generating apparatus 100 may generate the panoramic image 460 by stitching the selected reference image having the least change in image quality and the base image 411.

Figure 5:
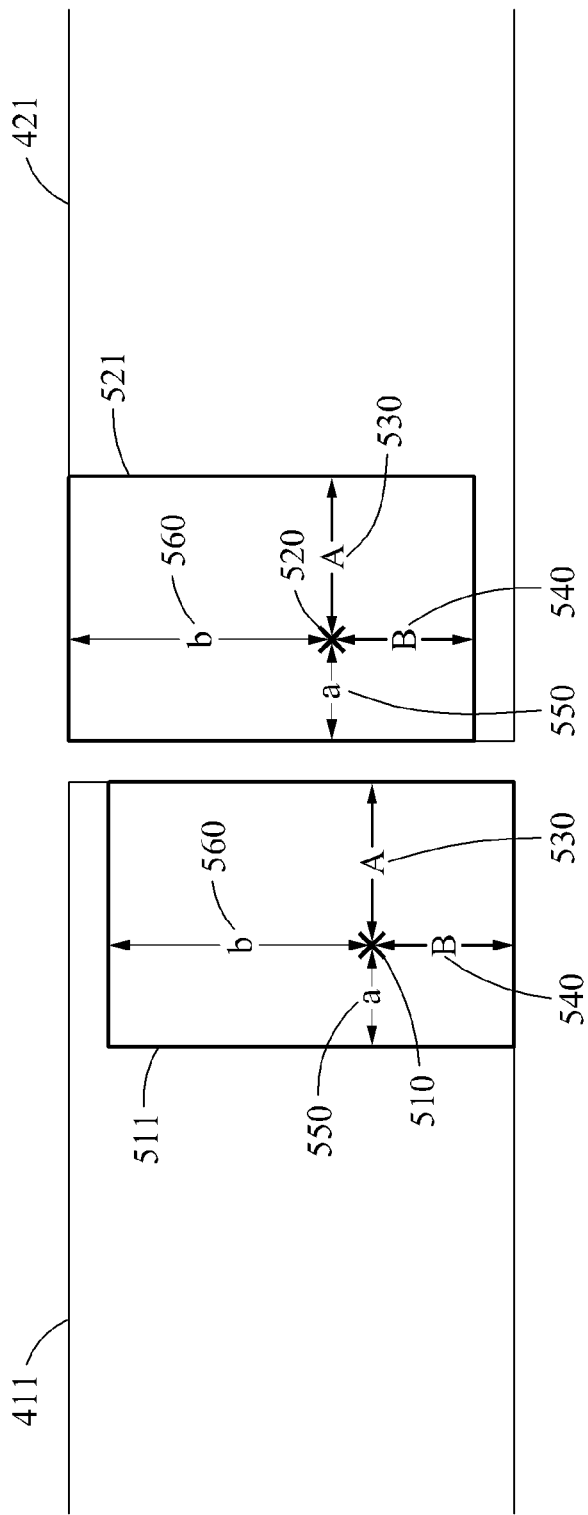
FIG. 5 illustrates an example of a target comparison area set for comparison according to an embodiment.

FIG. 5 illustrates an example of a target comparison area set for comparison according to an embodiment.

FIG. 5 illustrates an example of a target comparison area set based on a matching point among feature points in the overlapping area 450 of the base image 411 and the reference image 421 which are two-dimensionally captured as illustrated in FIG. 4.

Although sizes of the base image 411 and the reference image 421 are equal, contents in other areas excluding the overlapping area 450 in the base image 411 and the reference image 421 are different, and thus comparison of image qualities may not be possible. Since the matching point has an angle against a horizon, the target comparison area may be set based on a vertical direction of the overlapping area 450. Thus, the target comparison area setter 220 of FIG. 2 may set the target comparison area using the following method.

Referring to FIG. 5, when a matching point 510 of the base image 411 corresponds to $I_1(x,y)$ and a matching point 520 of the reference image 421 corresponds to $K_1(x,y)$, the target comparison area setter 220 may set a target comparison area 511 in the base image 411 having a starting point of $I_1(x+a, y+b)$, an end point of $I_1(x-A, y-B)$, and a size of A+a in width and B+b in height. Also, the target comparison area setter 220 may set a target comparison area 521 in the reference image 421 having a starting point of $K_1(x+a, y+b)$, an end point of $K_1(x-A, y-B)$, and a size of A+a in width and B+b in height.

Here, a first horizontal distance A 530, a first vertical distance B 540, a second horizontal distance a 550, and a second vertical distance b 560 of the target comparison areas may be determined based on respective locations of the matching point 510 and the matching point 520. In detail, the target comparison area setter 220 may determine vertical and horizontal distances from the matching point 510 to an end of the base image 411 in a direction in which the overlapping area 450 is located in the base image 411, and determine vertical and horizontal distances from the matching point 520 to an end of the reference image 421 in a direction in which the overlapping area 450 is located in the reference image 421. The target comparison area setter 220 may determine, to be vertical and horizontal distances of the target comparison areas, the determined vertical and horizontal distances.

For example, as illustrated in FIG. 5, a right area of the base image 411 is connected to a left area of the reference image 421, and thus the overlapping area 450 in the base image 411 may be located in a right side of the base image 411. Thus, the target comparison area setter 220 may measure a distance from the matching point 510 to a rightmost end of the base image 411 and determine the measured distance to be the first horizontal distance A 530.

The target comparison area setter 220 may set, to be the first vertical distance B 540, a shorter distance of a distance from the matching point 510 to an upper end of the base image 411 and a distance from the matching point 510 to a lower end of the base image 411.

Also, as illustrated in FIG. 5, the left area of the reference image 421 is connected to the right area of the base image 411, and thus the overlapping area 450 in the reference image 421 may be located in a left side of the reference image 421. Thus, the target comparison area setter 220 may measure a distance from the matching point 520 to a leftmost end of the reference image 421 and determine the measured distance to be the second horizontal distance a 550.

The target comparison area setter 220 may verify a direction of the first vertical distance B 540. Here, as illustrated in FIG. 5, the direction of the first vertical distance B 540 is in a lower portion, and thus the target comparison area setter 220 may determine, to be the second vertical distance b 560, a distance from the matching point 520 to an upper end of the reference image 421.

The target comparison area setter 220 may set the target comparison area 511 in the base image 411 and the target comparison area 521 in the reference image 421 by applying the first horizontal distance A 530, the first vertical distance B 540, the second horizontal distance a 550, and the second vertical distance b 560 based on the matching point 510 of the base image 411 and the matching point 520 of the reference image 421.

Figure 6:
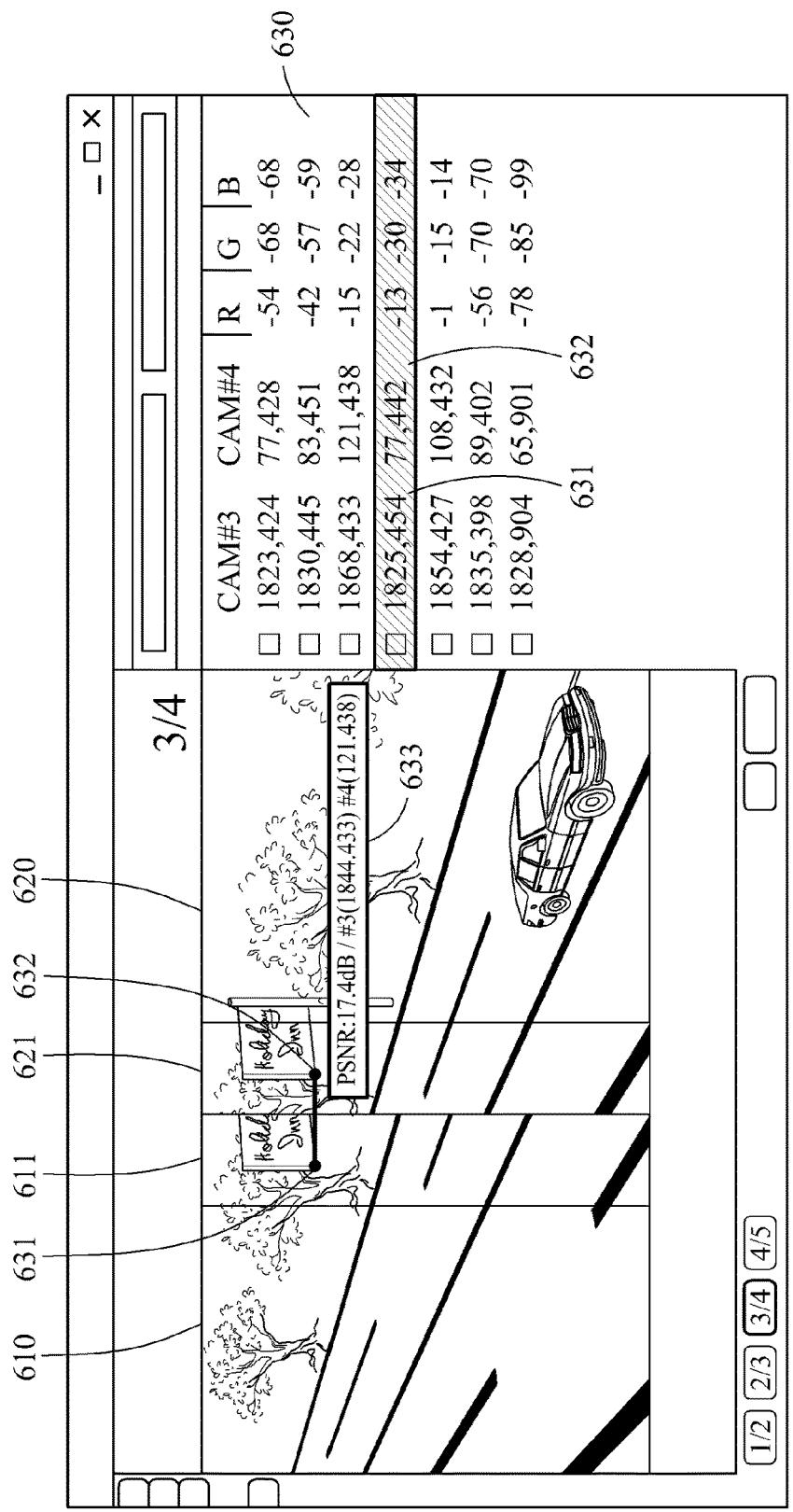
FIG. 6 illustrates an example of a screen shot displayed to a user in a process of generating a panoramic image according to an embodiment.

FIG. 6 illustrates an example of a screenshot displayed to a user in a process of generating a panoramic image according to an embodiment.

The panoramic image generating apparatus 100 of FIG. 1 may display a base image 610 and a reference image 620 as illustrated in FIG. 6. The panoramic image generating apparatus 100 may display the base image 610 and the reference image 620 by distinguishing, from other areas, an overlapping image 611 in the base image 610 and an overlapping area 621 in the reference image 620.

The panoramic image generating apparatus 100 may also display a list 630 of matching points, for example, a matching point 631 of the base image 610 and a matching point 632 of the reference image 620. The list 630 may include coordinates and color values of the matching point 631 and the matching point 632.

When the user selects one of the matching points from the list 630, the panoramic image generating apparatus 100 may display a location of the matching point selected by the user and a result 633 of measuring a change in image quality of a reference image corresponding to the matching point selected by the user.

The panoramic image generating apparatus 100 may enable the user to determine and select a desirable matching point by displaying the list 630 of the matching points and the result 633 of measuring the change in image quality corresponding to the matching point selected from the matching points in the list 630 by the user.

In addition, the panoramic image generating apparatus 100 may enable a capturer to readily verify whether a camera pose issue occurs by predicting and displaying an image quality of a panoramic image using the captured base image 610 and the reference image 620.

Figure 7:
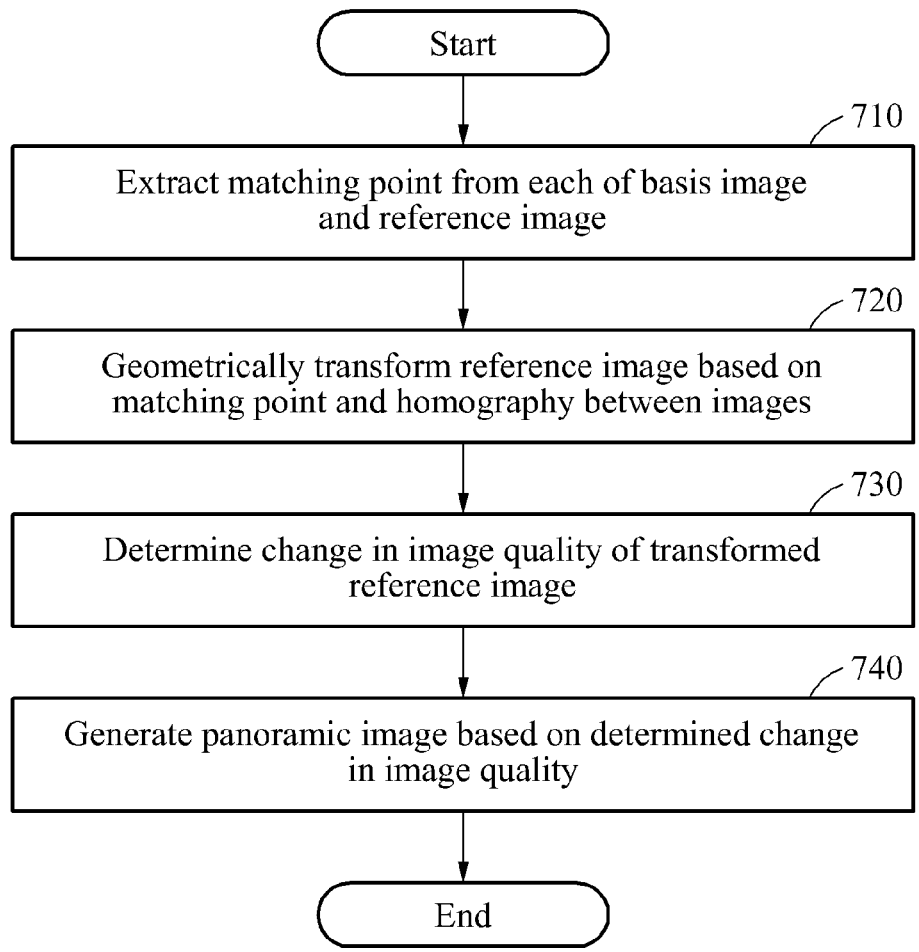
FIG. 7 is a flowchart illustrating a method of generating a panoramic image according to an embodiment.

FIG. 7 is a flowchart illustrating a panoramic image generating method according to an embodiment.

Referring to FIG. 7, in operation 710, the matching point extractor 110 of FIG. 1 extracts a matching point from a base image and a reference image to connect the base image to the reference image. The matching point extractor 110 selects at least one feature point from feature points of an object included in an overlapping area of the base image and the reference image. The matching point extractor 110 matches the feature point of the base image and the reference image to extract the matching point.

In operation 720, the reference image transformer 120 of FIG. 1, determines a homography between the base image and the reference image based on the matching point extracted in operation 710, and geometrically transforms the reference image based on the determined homography between the base image and the reference image.

In operation 730, the image quality change determiner 130 of FIG. 1 determines a change in image quality of the geometrically transformed reference image that may occur due to the geometrical transforming performed in operation 720. Here, the image quality change determiner 130 sets a target comparison area for comparison in the base image and the reference image based on the matching point, compares an image quality of the set target comparison area in the base image or the reference image to an image quality of a target comparison area in the geometrically transformed reference image, and estimates an image quality degradation occurring due to the geometrical transforming of the reference image.

In operation 740, the panoramic image generator 140 of FIG. 1 generates a panoramic image in which the reference image geometrically transformed by the reference image transformer 120 is connected to the base image based on the change in image quality determined in operation 730.

FIG. 8 is a flowchart illustrating a process of determining a change in image quality in a panoramic image generating method according to an embodiment. Operations 810 through 830 to be described with reference to FIG. 8 may be included in operation 730 described with reference to FIG. 7. Operations 810 through 830 may be performed as a separate method independent of the operations described with reference to FIG. 7.

Referring to FIG. 8, in operation 810, an inverse transformer 210 of FIG. 2 inversely transforms the reference image geometrically transformed in operation 720. The inversely transformed image may be an image resulting from inversely transforming the homography between the base image and the reference image.

In operation 820, the target comparison area setter 220 of FIG. 2 sets a target comparison area for comparison in the base image and the reference image based on the matching point extracted by the matching point extractor 110.

Here, the target comparison area setter 220 determines a first horizontal distance based on a direction in which the matching point is located from a center of the base image. The target comparison area setter 220 determines a second horizontal distance based on a direction in which the matching point is located from a center of the reference image. The target comparison area setter 220 determines a vertical distance based on a distance from the matching point to an upper end or a lower end of the base image. The target comparison area setter 220 sets the target comparison area by applying the first horizontal distance, the second horizontal distance, and the vertical distance based on the matching point.

In operation 830, the image quality change measurer 230 of FIG. 2 compares an image quality of the target comparison area in the base image or the reference image to an image quality of the target comparison area in the reference image inversely transformed in operation 810, and estimates an image quality degradation occurring due to the geometrical transforming of the reference image based on a result of comparing the image qualities.

FIG. 9 is a flowchart illustrating a process of generating a panoramic image in a panoramic image generating method according to an embodiment. Operations 910 through 950 to be described with reference to FIG. 9 may be included in operation 740 described with reference to FIG. 7. Operations 910 through 950 may be performed as a separate method independent of the operations described with reference to FIG. 7.

Referring to FIG. 9, in operation 910, the image display 310 of FIG. 3 displays the base image and the reference image on a screen to provide a user with the base image and the reference image. The image display 310 displays the matching point extracted by the matching point extractor 110 in the base image and the reference image. In addition, when the matching point extractor 110 extracts a plurality of matching points, the image display 310 may display a list of the matching points on the screen.

In operation 920, the measurement result display 320 of FIG. 3 verifies whether the user selects any one from the matching points displayed in operation 910. When the user does not select a matching point, the measurement result display 320 may repeatedly perform operation 920. Conversely, when the user selects a matching point, the measurement result display 320 may perform operation 930.

In operation 930, the measurement result display 320 displays a result of measuring a change in image quality of the reference image geometrically transformed based on the matching point selected by the user. For example, when the user selects at least one matching point from the list displayed by the image display 310, the measurement result display 320 may display a result of measuring a change in image quality of the reference image corresponding to the matching point selected by the user.

In operation 940, the transformed image corrector 330 of FIG. 3 finely corrects the reference image geometrically transformed in operation 720 based on the change in image quality of the reference image determined in operation 730.

In operation 950, the image generator 340 of FIG. 3 generates the panoramic image by connecting the reference image finely corrected in operation 940 to the base image. Here, a method of connecting the reference image to the base image by the image generator 340 may be stitching.

According to example embodiments, setting a target comparison area for comparison in a base image, a reference image, and a geometrically transformed reference image, and comparing image qualities of the images may enable an easy estimation of a change in image quality that may occur in a process of connecting the base image and the reference image to generate a panoramic image.

In addition, providing a user with a result of measuring a change in image quality based on each matching point may enable the user to readily predict an image quality of a panoramic image generated using a corresponding matching point.

Further, predicting the image quality and displaying the panoramic image using the captured images may enable a capturer to readily verify whether a camera pose issue occurs.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure

What is claimed is:

1. A method of generating a panoramic image, comprising:
    extracting a matching point to connect a base image captured by a first camera and a reference image captured by a second camera;
    geometrically transforming the reference image by determining a homography between the base image and the reference image based on the matching point;
    determining a change in image quality of the geometrically transformed reference image by
    inversely transforming the geometrically transformed reference image,
    setting a target comparison area for comparison in the base image and the reference image based on a location of the matching point with respect to the base image and the reference image,
    comparing an image quality of the set target comparison area in the base image or the reference image to an image quality of a target comparison area in the inversely transformed reference image, and
    estimating an image quality degradation occurring due to the geometrical transforming of the reference image based on a result of the comparing; and
    generating a panoramic image in which the geometrically transformed reference image is connected to the base image based on the determined change in image quality.

2. The method of claim 1, wherein the setting of the target comparison area comprises:
    determining a first horizontal distance based on a direction in which the matching point is located from a center of the base image;
    determining a second horizontal distance based on a direction in which the matching point is located from a center of the reference image;

determining a vertical distance based on a distance between the matching point and an upper end or a lower end of the base image; and setting the target comparison area by applying the first horizontal distance, the second horizontal distance, and the vertical distance based on the matching point.

3. The method of claim 1, wherein the generating of the panoramic image comprises:

displaying matching points in response to the extracting of the matching points from the base image and the reference image;

displaying a change in image quality of the reference image geometrically transformed based on a matching point selected from the matching points by a user; and generating a panoramic image in which the reference image geometrically transformed based on the matching point selected by the user is connected to the base image, in response to the selecting of the matching point displaying the change in image quality.

4. A method of measuring a change in image quality occurring through generation of a panoramic image using a base image and a reference image, the method comprising:

inversely transforming a geometrically transformed reference image based on a homography between a base image captured by a first camera and a reference image captured by a second camera;

setting a target comparison area for comparison in the inversely transformed reference image, and the base image or the reference image based on a location of a matching point to connect the base image and the reference image with respect to the base image and the reference image;

comparing an image quality of the set target comparison area in the base image or the reference image to an image quality of the set target comparison area in the inversely transformed reference image; and estimating an image quality degradation occurring due to the geometrical transforming of the reference image based on a result of the comparing.

5. The method of claim 4, wherein the setting of the target comparison area comprises:

determining a first horizontal distance based on a direction in which the matching point is located in the base image;

determining a second horizontal distance based on a direction in which the matching point is located in the reference image;

determining a vertical distance based on a distance between the matching point and an upper end or a lower end of the base image; and setting the target comparison area by applying the first horizontal distance, the second horizontal distance, and the vertical distance based on the matching point.

6. The method of claim 5, wherein, when a right area of the base image is connected to a left area of the reference image, the determining of the first horizontal distance comprises measuring a distance from the matching point to a rightmost end of the base image and determining the measured distance to be the first horizontal distance.

7. The method of claim 5, wherein, when a right area of the base image is connected to a left area of the reference image, the determining of the second horizontal distance comprises measuring a distance from the matching point to a leftmost end of the reference image and determining the measured distance to be the second horizontal distance.

8. The method of claim 5, wherein the determining of the vertical distance comprises:

setting, to be a first vertical distance, a shorter distance of a distance from the matching point to an upper end of the base image and a distance from the matching point to a lower end of the base image;

setting, to be a second vertical distance, a distance having a direction different from a direction of the first vertical distance of a distance from the matching point to an upper end of the reference image and a distance from the matching point to a lower end of the reference image; and setting the first vertical distance and the second vertical distance in combination, to be the vertical distance.

9. The method of claim 4, wherein the inversely transformed reference image is an image resulting from the inverse transforming of the homography between the base image and the reference image.

10. An apparatus for generating a panoramic image, comprising:

a processor configured to extract a matching point to connect a base image captured by a first camera and a reference image captured by a second camera, geometrically transform the reference image by determining a homography between the base image and the reference image based on the matching point, determine a change in image quality of the geometrically transformed reference image by inversely transforming the geometrically transformed reference image, setting a target comparison area for comparison in the base image and the reference image based on based on a location of the matching point with respect to the base image and the reference image, comparing an image quality of the set target comparison area in the base image or the reference image to an image quality of a target comparison area in the inversely transformed reference image, and estimating an image quality degradation occurring due to the geometrical transforming of the reference image based on a result of the comparing, and generate a panoramic image in which the geometrically transformed reference image is connected to the base image based on the determined change in image quality.

11. The apparatus of claim 10, wherein the processor comprises:

a matching point extractor configured to extract the matching point to connect the base image captured by the first camera and the reference image captured by the second camera;

a reference image transformer configured to geometrically transform the reference image by determining the homography between the base image and the reference image based on the matching point;

an image quality change determiner configured to determine the change in image quality of the geometrically transformed reference image; and a panoramic image generator configured to generate the panoramic image in which the geometrically transformed reference image is connected to the base image based on the determined change in image quality.

12. The apparatus of claim 11, wherein the image quality change determiner comprises:

an inverse transformer configured to inversely transform the geometrically transformed reference image;

a target comparison area setter configured to set the target comparison area for comparison in the base image and the reference image based on the location of the matching point with respect to the base image and the reference image; and an image quality change measurer configured to compare the image quality of the set target comparison area in the base image or the reference image to the image quality of the target comparison area in the inversely transformed reference image, and estimate the image quality degradation occurring due to the geometrical transforming of the reference image based on the result of the comparing.

13. The apparatus of claim 12, wherein the target comparison area setter is configured to determine a first horizontal distance based on a direction in which the matching point is located from a center of the base image, determine a second horizontal distance based on a direction in which the matching point is located from a center of the reference image, determine a vertical distance based on a distance between the matching point and an upper end or a lower end of the base image, and set the target comparison area by applying the first horizontal distance, the second horizontal distance, and the vertical distance based on the matching point.

14. The apparatus of claim 11, wherein the panoramic image generator comprises:

an image display configured to display matching points in response to the extracting of the matching points from the base image and the reference image;

a measurement result display configured to display a change in image quality of the reference image geometrically transformed based on a matching point selected from the matching points by a user; and an image generator configured to generate a panoramic image in which the reference image geometrically transformed based on the matching point selected by the user is connected to the base image, in response to the selecting of the matching point displaying the change in image quality.

15. The apparatus of claim 10, further comprising a memory configured to store instructions, wherein the processor is further configured to execute the instructions to configure the processor to extract the matching point to connect the base image captured by the first camera and the reference image captured by the second camera, geometrically transform the reference image by determining the homography between the base image and the reference image based on the matching point, determine the change in image quality of the geometrically transformed reference image, and generate the panoramic image in which the geometrically transformed reference image is connected to the base image based on the determined change in image quality.

* * * * *